US012727030B2

(12) United States Patent
Wang

(10) Patent No.: US 12,727,030 B2
(45) Date of Patent: Sep. 1, 2026

(54) SIGNAL RECEIVING METHOD AND APPARATUS, ELECTRONIC DEVICE, AND STORAGE MEDIUM

(71) Applicant: VIVO MOBILE COMMUNICATION CO., LTD., Chang'an Dongguan (CN)

(72) Inventor: Yuming Wang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 303 days.

(21) Appl. No.: 18/407,307

(22) Filed: Jan. 8, 2024

(65) Prior Publication Data

US 2024/0163925 A1 May 16, 2024

Related U.S. Application Data

(63) Continuation of application No. PCT/CN2022/104022, filed on Jul. 6, 2022.

(30) Foreign Application Priority Data

Jul. 8, 2021 (CN) ......................... 202110772821.7

(51) Int. Cl.
*H04W 74/0816* (2024.01)
*H04B 17/318* (2015.01)
(Continued)

(52) U.S. Cl.
CPC ...... *H04W 74/0816* (2013.01); *H04B 17/328* (2023.05); *H04B 17/336* (2015.01); *H04W 52/52* (2013.01)

(58) Field of Classification Search
CPC ... H04B 17/328; H04B 17/336; H04W 52/52; H04W 74/0816
See application file for complete search history.

(56) References Cited

U.S. PATENT DOCUMENTS

2017/0079067 A1 3/2017 Li et al.
2017/0332405 A1 11/2017 Son et al.
(Continued)

FOREIGN PATENT DOCUMENTS

CN 104202755 A 12/2014
CN 105101347 A 11/2015
(Continued)

OTHER PUBLICATIONS

ZTE, ZTE Microelectronics, "Channel Sensing Based Scheme for Cross-Link Interference Mitigation in Nr," 3GPP TSG RAN WG1 Meeting #88, R1-1701617, Athens, Greece, Feb. 13-17, 2017.

*Primary Examiner* — Brian P Cox
(74) *Attorney, Agent, or Firm* — Price Heneveld LLP

(57) ABSTRACT

This application discloses a signal receiving method and apparatus, an electronic device, and a storage medium. The method includes: obtaining a first signal strength and a second signal strength before a first signal is received; in a case that the second signal strength is greater than the first signal strength and that a difference between the second signal strength and the first signal strength is greater than or equal to a first threshold, determining that the first signal is an interference signal and determining not to receive the interference signal; and in a case that the second signal strength is less than or equal to the first signal strength, performing first receiving and processing on the first signal; where the second signal strength is signal strength from a corresponding access point, and the first signal strength is signal strength of the first signal.

14 Claims, 6 Drawing Sheets

(51) Int. Cl.
*H04B 17/336* (2015.01)
*H04W 52/52* (2009.01)

(56) References Cited

U.S. PATENT DOCUMENTS

| | | | |
|---|---|---|---|
| 2017/0346578 | A1 | 11/2017 | Sundararajan et al. |
| 2018/0077654 | A1 | 3/2018 | Kulkarni et al. |
| 2018/0220430 | A1 | 8/2018 | Wikstrom et al. |
| 2018/0220460 | A1 | 8/2018 | Mestanov et al. |
| 2018/0343096 | A1 | 11/2018 | Kim et al. |
| 2019/0007872 | A1 | 1/2019 | Sundberg et al. |
| 2019/0182869 | A1 | 6/2019 | Morioka |
| 2020/0314906 | A1 | 10/2020 | Goyal et al. |
| 2022/0061096 | A1 | 2/2022 | Lin |

FOREIGN PATENT DOCUMENTS

| | | | |
|---|---|---|---|
| CN | 107276686 | A | 10/2017 |
| CN | 108029057 | A | 5/2018 |
| CN | 109845388 | A | 6/2019 |
| CN | 110719119 | A | 1/2020 |
| CN | 111405651 | A | 7/2020 |
| CN | 111491352 | A | 8/2020 |
| CN | 112235855 | A | 1/2021 |
| CN | 113067597 | A | 7/2021 |
| CN | 113489556 | A | 10/2021 |
| EP | 2996425 | A1 | 3/2016 |
| WO | 2016163657 | A1 | 10/2016 |
| WO | 2020224418 | A1 | 11/2020 |

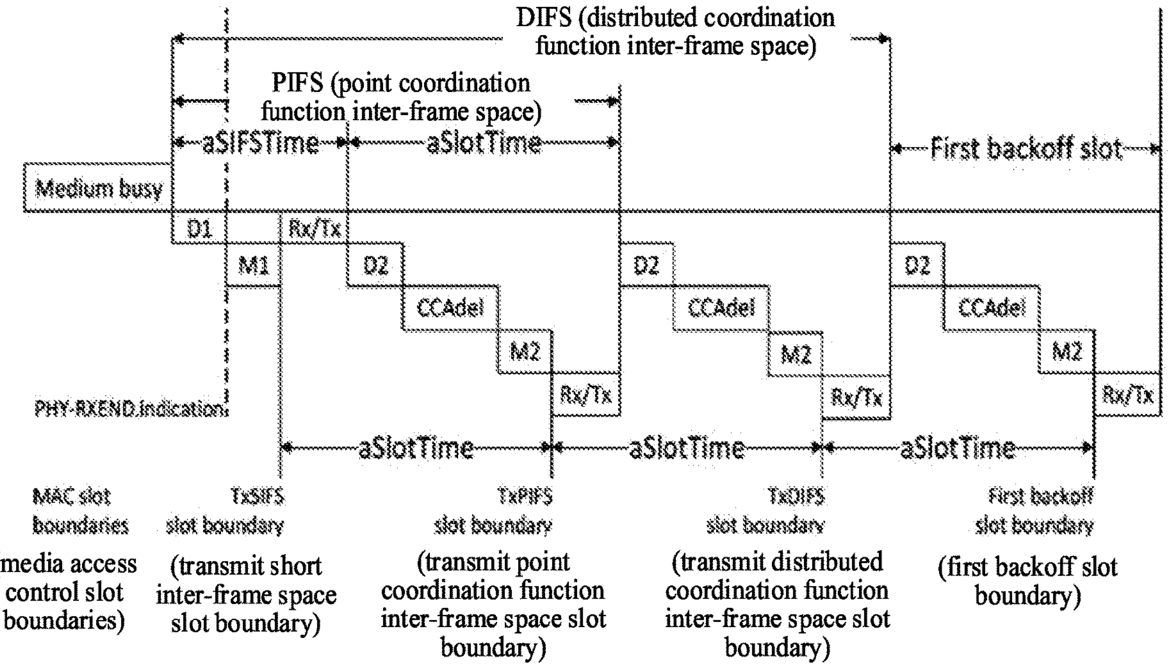

D1=aRXRFDelay (radio frequency delay)+aRXPLCPDelay (physical layer header reception delay)
D2 = D1 +aAirPropagationTime (propagation delay)
Rx/Tx=aRxTxTurnaroundTime (begins with a PHY-TXSTART.request) (time for antenna to switch from receive mode to transmit mode)
M1 = M2 =aMACProcessingDelay (MAC layer processing delay)
CCAdel=aCCATime (CCA time)-D1
aSIFSTime: short inter-frame space time
aSlotTime: slot time
CCA: (Clear Channel Assesment, clear channel assesment)
CCAdel: CCA procedure

FIG. 1

SIGNAL RECEIVING METHOD AND APPARATUS, ELECTRONIC DEVICE, AND STORAGE MEDIUM

CROSS-REFERENCE TO RELATED APPLICATIONS

This application is a Bypass continuation application of PCT International Application No. PCT/CN2022/104022 filed on Jul. 6, 2022, which claims priority to Chinese Patent Application No. 202110772821.7, filed on Jul. 8, 2021 and entitled "SIGNAL RECEIVING METHOD AND APPARATUS, ELECTRONIC DEVICE, AND STORAGE MEDIUM", which are incorporated in their entireties by reference herein.

TECHNICAL FIELD

This application pertains to the field of communication technologies, and specifically relates to a signal receiving method and apparatus, an electronic device, and a storage medium.

BACKGROUND

In physical carrier sensing and virtual carrier sensing, after a station (STA) generates random backoff parameters, a clear channel assessment (CCA) need to be performed to check a current channel occupancy status every time the backoff count decreases. When the backoff count reaches zero and no other STA is transmitting data, the STA can start transmitting data.

However, in an open and complex environment, a wireless environment may be undesirable, and there may be a lot of interference signals received. The CCA detection result may continuously indicate a busy channel state, and consequently, the backoff count of the STA is unable to decrease progressively or reach zero. This leads to a conflict with another STA and thus may result in inability or failure of data packet transmission of the station.

SUMMARY

An objective of embodiments of this application is to provide a signal receiving method and apparatus, an electronic device, and a storage medium.

According to a first aspect, an embodiment of this application provides a signal receiving method, where the method includes:

- obtaining a first signal strength and a second signal strength before a first signal is received;
- in a case that the second signal strength is greater than the first signal strength and that a difference between the second signal strength and the first signal strength is greater than or equal to a first threshold, determining that the first signal is an interference signal and determining not to receive the interference signal; and
- in a case that the second signal strength is less than or equal to the first signal strength, performing first receiving and processing on the first signal; where
- the second signal strength is signal strength from a corresponding access point, and the first signal strength is signal strength of the first signal.

According to a second aspect, an embodiment of this application provides a signal receiving apparatus, where the apparatus includes:

- an obtaining module configured to obtain a first signal strength and a second signal strength before a first signal is received;
- a first determining module configured to: in a case that the second signal strength is greater than the first signal strength and that a difference between the second signal strength and the first signal strength is greater than or equal to a first threshold, determine that the first signal is an interference signal and determine not to receive the interference signal; and
- a receiving and processing module configured to: in a case that the second signal strength is less than or equal to the first signal strength, perform first receiving and processing on the first signal; where
- the second signal strength is signal strength from a corresponding access point, and the first signal strength is signal strength of the first signal.

According to a third aspect, an embodiment of this application provides an electronic device, where the electronic device includes a processor, a memory, and a program or instruction stored in the memory and capable of running on the processor, and when the program or instruction is executed by the processor, the steps of the method according to the first aspect are implemented.

According to a fourth aspect, an embodiment of this application provides a non-transitory readable storage medium, where the non-transitory readable storage medium stores a program or instruction, and when the program or instruction is executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instruction so as to implement the method according to the first aspect.

BRIEF DESCRIPTION OF DRAWINGS

FIG. 1 is a schematic diagram of a DCF core mechanism according to an embodiment of this application;

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that the data used in this way is interchangeable in appropriate circumstances such that the embodiments of this application can be implemented in other orders than the order illustrated or described herein. In addition, objects distinguished by "first", "second", and the like are generally of a same type, and the quantities of the objects are not limited. For example, there may be one or more first objects. In addition, "and/or" in the specification and claims represents at least one of connected objects, and the character "/" generally indicates that the associated objects have an "or" relationship.

The following describes in detail the signal receiving method and apparatus provided in the embodiment of this application through specific embodiments and application scenarios thereof with reference to the accompanying drawings.

The following content is described first.

Figure 2:
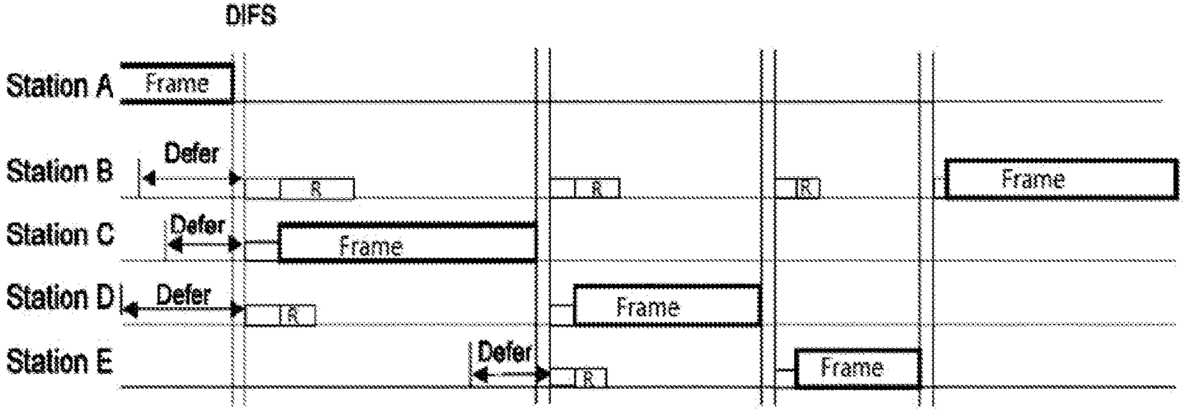
FIG. 2 is a schematic diagram of a DCF backoff mechanism according to an embodiment of this application.

FIG. 1 is a schematic diagram of a distributed coordination function (DCF) core mechanism according to an embodiment of this application. As shown in FIG. 1, a Wi-Fi device channel contention principle is shown. FIG. 2 is a schematic diagram of a DCF backoff mechanism according to an embodiment of this application. As shown in FIG. 2, in a carrier sense multiple access with collision avoidance (CSMA/CA) mechanism, physical carrier sensing and virtual carrier sensing can be introduced. After an STA generates random backoff parameters, each time a backoff count decreases, CCA needs to be performed to check the current channel occupancy status. Only when the backoff count decreases to 0 and no another station (STA) is transmitting data, can the STA start transmitting data. When the backoff count decreases to 0, in a case that a backoff count of another STA decreases to 0, a larger backoff parameter is generated, clear channel assessment (CCA) is performed again to check the current channel occupancy status. The backoff count is reduced until the backoff count is 0, and the process continues in a similar manner.

Figure 3:
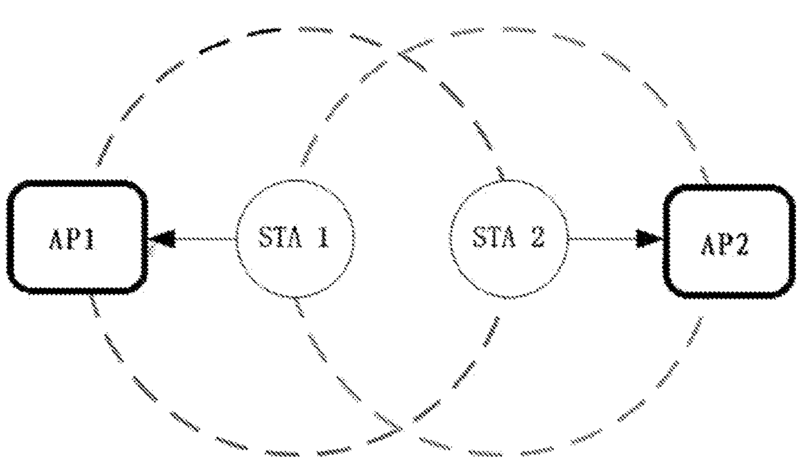
FIG. 3 is a schematic topological view of a station and an access point according to an embodiment of this application.

FIG. 3 is a schematic topological view of a station and an access point according to an embodiment of this application. As shown in FIG. 3, in this topology, STA1 and STA2 are two stations, where STA1 is correlated to access point (AP) 1, and STA2 is correlated to AP2. In the figure, the dashed circle centering around STA1 can indicate a transmission range of STA1, and the dashed circle centering around STA2 can indicate a transmission range of STA2.

AP1 is within a coverage area of STA1 but not within a coverage area of STA2. AP2 is within the coverage area of STA2 but not within the coverage area of STA1. Therefore, AP1 can only receive data from STA1, and AP2 can only receive data from STA2. When STA1 and STA2 perform transmission simultaneously, no conflict occurs at both receiving points AP1 and AP2, so that STA1 and STA2 can perform transmission simultaneously. However, due to topological specialty and a working mechanism of CSMA/CA in DCF, STA1 and STA2 cannot perform transmission simultaneously.

Figure 4:
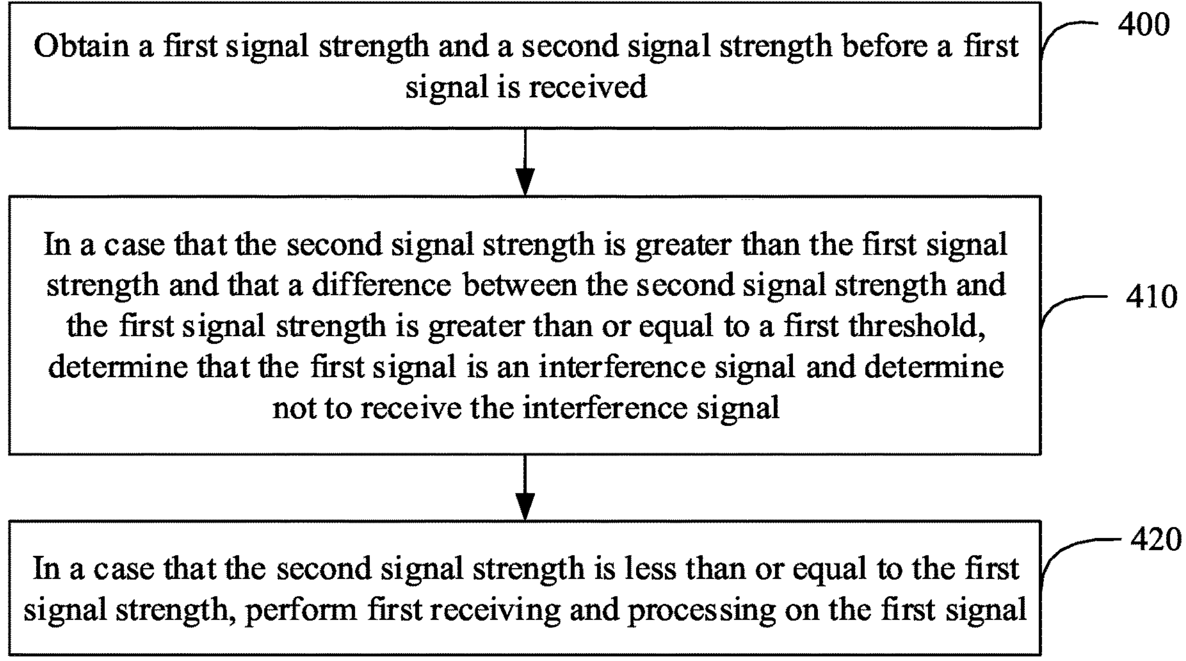
FIG. 4 is a first schematic flowchart of a signal receiving method according to an embodiment of this application.

FIG. 4 is a first schematic flowchart of a signal receiving method according to an embodiment of this application. As shown in FIG. 4, the method includes the following steps:

Step 400. Obtain a first signal strength and a second signal strength before a first signal is received.

Step 410. In a case that the second signal strength is greater than the first signal strength and that a difference between the second signal strength and the first signal strength is greater than or equal to a first threshold, determine that the first signal is an interference signal and determine not to receive the interference signal.

Step 420. In a case that the second signal strength is less than or equal to the first signal strength, perform first receiving and processing on the first signal.

The second signal strength is signal strength from a corresponding access point, and the first signal strength is signal strength of the first signal.

Optionally, in order to prevent the CCA detection result continuously indicating a busy channel state, reception of interference signals can be avoided as much as possible to provide a stable environment for data transmission.

Optionally, the signal receiving method may be performed by any target STA. For such target STA, the interference signal may be a weak signal and/or a signal whose destination address is not the target STA, such as a weak signal or a signal of a hidden terminal, and may further include a signal that may damage the receiving of wanted signals to the target STA.

Optionally, because in different communication systems, signal strength from an access point that the target STA connects to may not be a fixed value, and the signal strength of connected access point signals varies in different scenarios, when determining whether the currently received signal is an interference signal, it is not directly assumed that signals within a specified threshold range of signal strength are considered interference signals, so as to avoid situations where valid signals are mistakenly ignored as interference signals in some scenarios, or where there are still many interference signals leading to a busy result in CCA detection in some other scenarios.

Optionally, a definition threshold of the interference signal can be dynamically adjusted based on the signal strength of the currently connected access point. It is similar in transmitting direction and receiving direction that the CCA detection result can be prevented from continuously being busy by ignoring the interference signal, and the update of network allocation vector (NAV) of the virtual carrier sensing can be actively prevented.

Therefore, the target STA can determine whether a difference between the second signal strength between the target STA and the currently connected access point and the first signal strength of the first signal is greater than or equal to a first threshold. If the difference is greater than or equal to the first threshold, the first signal can be determined to be the interference signal, so that the first signal can be ignored during signal receiving, or not receiving the first signal.

Optionally, in a case that the second signal strength is less than or equal to the first signal strength, the target STA can determine that the first signal may not be the interference signal and can perform first receiving and processing on the first signal.

Optionally, the first threshold may be predetermined or may be a fixed value. For example, the predetermined value may be 20 dB, 21 dB, or 18 dB, and this is not limited in this embodiment of this application.

In the embodiments of this application, whether a currently received target signal of the electronic device is an interference signal is dynamically determined based on a difference between signal strength of the target signal and signal strength of a currently connected access point, dynamically blocking relatively weak signals, especially signals of hidden terminals. This can prevent keeping clear channel assessment always in busy state, so as to provide a more stable data uploading environment for the electronic device, ensuring that signals can be normally and stably transmitted.

Optionally, the performing first receiving and processing on the first signal includes:

when a second signal is being received, in a case that the first signal strength is greater than a third signal strength of the second signal and that a difference between the first signal strength and the third signal strength is greater than or equal to an abortion threshold, aborting receiving of the second signal and performing second receiving and processing on the first signal.

Optionally, the second signal can be a currently received signal of the target STA when performing first receiving and processing on the first signal is determined.

Optionally, during receiving of the second signal, continuous detection of signal fluctuations in current space can be performed. If a new signal, or the first signal, is detected in the current channel, and it is determined that the first receiving and processing can be performed on the first signal, a signal strength hopping value between the first signal and the second signal can be determined.

Optionally, the third signal strength can be the signal strength of the second signal.

Optionally, it can be determined whether a difference (or the hopping value) between the first signal strength and the third signal strength is greater than or equal to the abortion threshold. If the hopping value is greater than or equal to the abortion threshold, the second signal can be determined to be an interference signal, so that receiving of the second signal can be aborted, and second receiving and processing can be performed on the first signal. If the hopping value is less than the abortion threshold, the second signal can be completely received.

Optionally, when performing the first receiving and processing on the first signal is determined, the target STA can receive the first signal in a case of not receiving any signal.

In this embodiment of this application, in a case that a first signal with a hopping value greater than the abortion threshold is detected in the current channel, it is determined that the second signal being received by the target STA is an interference signal. The receiving of the current second signal is immediately aborted, and a new data packet, or the first signal, is received instead. This can enhance robustness of the system in the receiving direction.

Optionally, in a case that a modulation scheme is complementary code keying, the abortion threshold is a second threshold; and in a case that the modulation scheme is orthogonal frequency division multiplexing, the abortion threshold is a third threshold.

Optionally, the second threshold may be 6 dB, that is, in a case that the modulation scheme is complementary code keying, the abortion threshold is 6 dB; and optionally, the third threshold may be 12 dB, that is, in a case that the modulation scheme is orthogonal frequency division multiplexing, the abortion threshold is 12 dB.

Optionally, in a case that the modulation scheme is complementary code keying, if the first signal strength is greater than the third signal strength of the second signal, and a difference therebetween is greater than or equal to the second threshold, the receiving of the second signal can be aborted, and a newly detected signal with greater strength, or the first signal, can be received instead.

Optionally, in a case that the modulation scheme is orthogonal frequency division multiplexing, if the first signal strength is greater than the third signal strength of the second signal, and a difference therebetween is greater than or equal to the third threshold, the receiving of the second signal can be aborted, and a newly detected signal with greater strength, or the first signal, can be received instead.

Optionally, when the target STA determines to perform receiving and processing on the first signal, the modulation scheme of the first signal can be further determined. In a case that the modulation scheme is complementary code keying, it can be determined whether the receiving of the second signal is aborted based on the second threshold; and in a case that the modulation scheme is orthogonal frequency division multiplexing, it can be determined whether the receiving of the second signal is aborted based on the third threshold.

For example, in the case that the modulation scheme is complementary code keying, when it is determined that a difference between the first signal strength and the third signal strength is greater than or equal to the second threshold such as 6 dB, the receiving of the second signal is aborted, and second receiving and processing is performed on the first signal; and in the case that the modulation scheme is orthogonal frequency division multiplexing, when it is determined that a difference between the first signal strength and the third signal strength is greater than or equal to the third threshold such as 12 dB, the receiving of the second signal is aborted, and the second receiving and processing is performed on the first signal.

Optionally, the second threshold may be 6.5 dB, 5.5 dB, and the like, and this is not limited in this embodiment of this application.

Optionally, the third threshold may be 12.5 dB, 11.5 dB, and the like, and this is not limited in this embodiment of this application.

Optionally, the third threshold may be greater than the second threshold.

In this embodiment of this application, abortion thresholds under different modulation schemes are configured differently, so that the interference signal can be identified and blocked more precisely, further improving robustness of the entire system.

Optionally, the aborting the receiving of the second signal and performing second receiving and processing on the first signal includes:

based on the signal strength of the first signal, updating an automatic gain control AGC value; and based on the updated AGC, performing third receiving and processing on the first signal.

Optionally, when it is determined that the second signal is an interference signal and the receiving is aborted, based on the signal strength of the first signal, an automatic gain control (AGC) value is reset, and a receiving state with a higher signal strength is being locked into to receive the first signal, thereby effectively preventing the valid signal from being interfered.

Therefore, when the receiving of the second signal is aborted, and the second receiving and processing is performed on the first signal, based on the signal strength of the first signal, the automatic gain control AGC value is updated, and based on the updated AGC, third receiving and processing is performed on the first signal.

Optionally, the performing the third receiving and processing on the first signal includes:

in a case that a modulation scheme is orthogonal frequency division multiplexing, obtaining a destination address of the first signal;

in a case that the destination address of the first signal is determined to be unmatched, determining that the first signal is the interference signal; and in a case that the destination address of the first signal is determined to be matched, receiving the first signal.

Optionally, for an orthogonal frequency division multiplexing (OFDM) data packet, data transmission is fast, and it takes relatively short time to receive an entire media access control (MAC) packet header. This allows for the directional extraction of a unique identifier of the receiving terminal of the signal, such as basic service set identifier (B S SID) value and receiver address or remote address (RA) value. In this way, validity of the first signal can be quantitatively determined. If it is determined that the first signal is invalid, the first signal can be directly ignored, thereby saving the subsequent data receiving time.

Optionally, in order to accurately analyze the superimposed signals within a desense threshold, rssi abort and RA/BSSID abort can be introduced in this embodiment of this application, so as to ensure robustness of receiving via two different signal modulation scheme, complementary code keying modulation and orthogonal frequency division multiplexing.

Optionally, during performing the third receiving and processing on the first signal based on the updated AGC, in the case that the modulation scheme is orthogonal frequency division multiplexing, the media access control packet header of the first signal is analyzed, and a destination address of the first signal is obtained. If the destination address of the first signal is not the target STA, that is, the target STA is determined to be unmatched with the destination address of the first signal, the first signal is determined to be an interference signal, and the receiving is aborted. If the destination address of the first signal is the current station, that is, the target STA is matched with the destination address of the first signal, the receiving of the first signal can be performed continuously and completely.

Optionally, during performing third receiving and processing on the first signal based on the updated AGC, in the case that the modulation scheme is complementary code keying, the receiving of the first signal can be performed continuously and completely.

Figure 5:
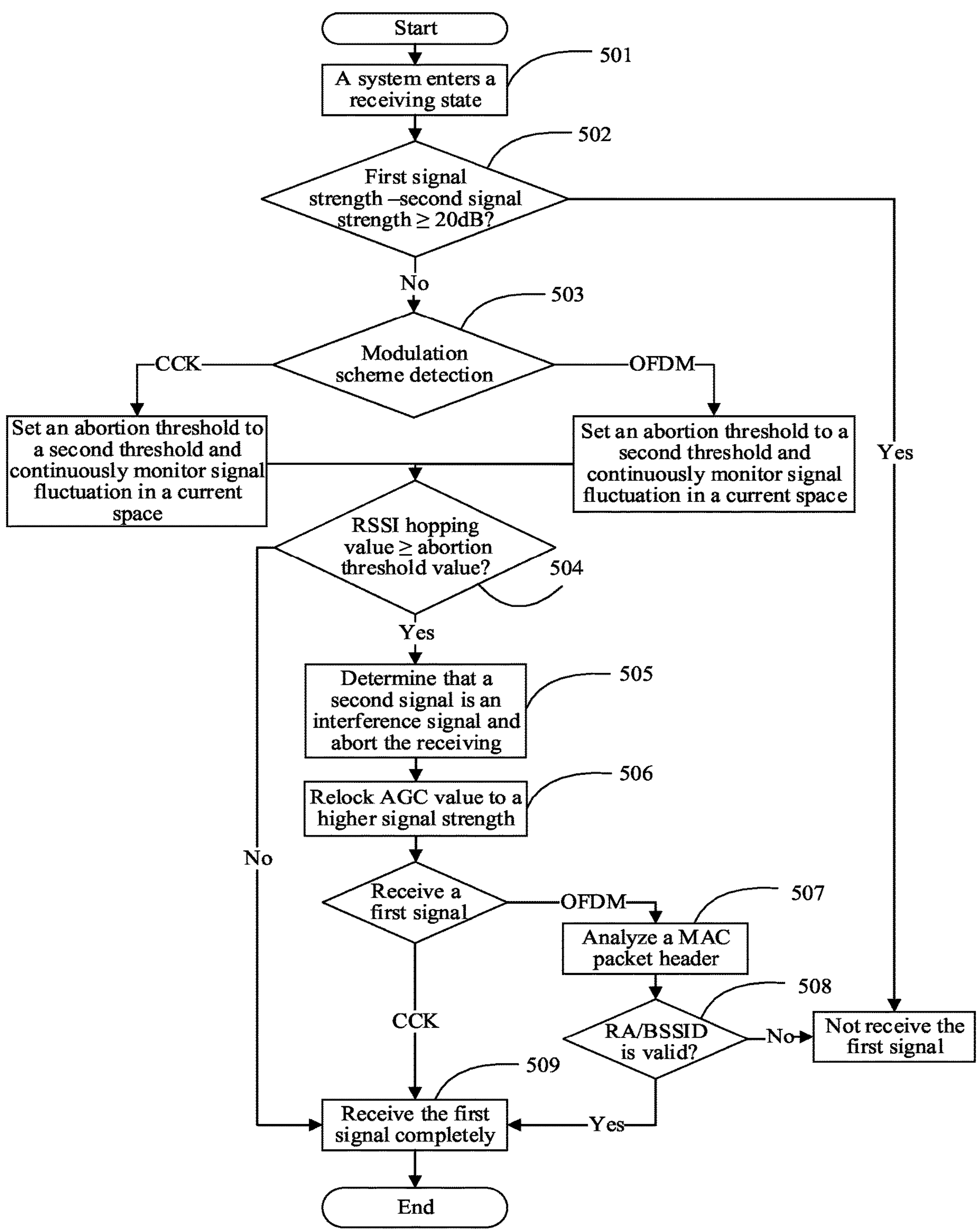
FIG. 5 is a second schematic flowchart of a signal receiving method according to an embodiment of this application.

FIG. 5 is a second schematic flowchart of a signal receiving method according to an embodiment of this application; as shown in FIG. 5, the method includes the following:

Step 501. A system of an electronic device enters a receiving state.

Step 502. Determine whether "second signal strength—first signal strength ≥20 dB" is satisfied.

Optionally, the electronic device, or the target STA, can determine a difference between the second signal strength of the corresponding access point and the first signal strength.

If second signal strength—first signal strength ≥20 dB, the first signal is determined to be an interference signal and the receiving is ignored. Otherwise, proceed to step 503.

Step 503. Detect the modulation scheme.

Under the condition that SNR for receiving signals is sufficient for analyzing, the modulation scheme of the first signal can be determined. If the modulation scheme is CCK, the abortion threshold can be set to the second threshold such as 6 dB. If the modulation scheme is OFDM, the abortion threshold can be set to the third threshold such as 12 dB.

Step 504. Determine whether "hopping value of signal strength ≥abortion threshold" is satisfied.

During receiving of the second signal, continuous detection of signal fluctuations in current space can be performed. If a new signal, or the first signal, is detected in the current channel, and it is determined that the first receiving and processing can be performed on the first signal, a hopping value (difference) between the first signal strength and the third signal strength of the second signal can be determined. If the difference is greater than or equal to the abortion threshold, proceed to step 505; otherwise, proceed to step 509.

Step 505. Determine that the second signal is an interference signal and abort the receiving.

Step 506. Relock the AGC value to a higher signal strength.

Optionally, based on the first signal, the AGC value can be reset to a higher signal strength and locked to a receiving state with a higher signal strength, so as to prevent the first signal (valid signal) from being interfered (RSSI Abort).

Optionally, a new AGC value can be set to the signal strength of the first signal.

Optionally, if the modulation scheme is CCK, proceed to step 509; and if the modulation scheme is OFDM, proceed to step 507.

Step 507. Analyze the MAC packet header.

Optionally, the MAC header of the first signal can be received and analyzed.

Step 508. Determine whether RA/BSSID is valid.

Optionally, if RA/BSSID values are determined to be valid from data analyzed in the packet header, proceed to step 509; otherwise, determine that the first signal to be an interference signal and abort the receiving (RA/BSSID Abort).

Step 509. A physical (PHY) layer of a port receives data packets continuously and completely.

In the embodiments of this application, whether a currently received target signal of the electronic device is an interference signal is dynamically determined based on a difference between signal strength of the target signal and signal strength of a currently connected access point, dynamically blocking relatively weak signals, especially signals of hidden terminals. This can prevent keeping clear channel assessment always in busy state, so as to provide a more stable data uploading environment for the electronic device, ensuring that signals can be normally and stably transmitted.

It should be noted that, the signal receiving method provided in this embodiment of this application may be performed by a signal receiving apparatus, or a control module in the signal receiving apparatus, configured to perform the signal receiving method. In this embodiment of this application, the signal receiving apparatus performing the signal receiving method is used as an example to describe the signal receiving apparatus provided in this embodiment of this application.

Figure 6:
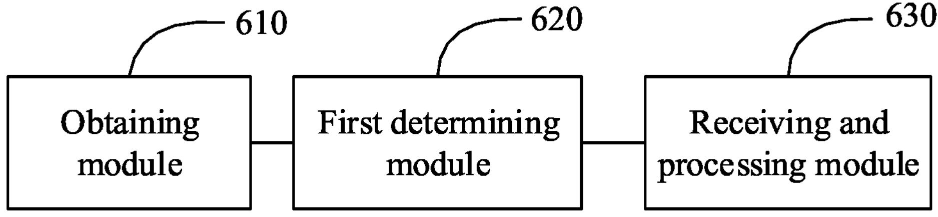
FIG. 6 is a schematic structural diagram of a signal receiving apparatus according to an embodiment of this application.

FIG. 6 is a schematic structural diagram of a signal receiving apparatus according to an embodiment of this application; as shown in FIG. 6, the apparatus includes: an obtaining module 610, a first determining module 620, and receiving and processing module 630, where the obtaining module 610 is configured to obtain a first signal strength and a second signal strength before a first signal is received;

the first determining module 620 is configured to: in a case that the second signal strength is greater than the first signal strength and that a difference between the second signal strength and the first signal strength is greater than or equal to a first threshold, determine that the first signal is an interference signal and determine not to receive the interference signal; and the receiving and processing module 630 is configured to perform first receiving and processing on the first signal in a case that the second signal strength is less than or equal to the first signal strength; where the second signal strength is signal strength from a corresponding access point, and the first signal strength is signal strength of the first signal.

In the embodiments of this application, whether a currently received target signal of the electronic device is an interference signal is dynamically determined based on a difference between signal strength of the target signal and signal strength of a currently connected access point, dynamically blocking relatively weak signals, especially signals of hidden terminals. This can prevent keeping clear channel assessment always in busy state, so as to provide a more stable data uploading environment for the electronic device, ensuring that signals can be normally and stably transmitted.

Optionally, the receiving and processing module is further configured to:

when a second signal is being received, in a case that the first signal strength is greater than a third signal strength of the second signal and that a difference between the first signal strength and the third signal strength is greater than or equal to an abortion threshold, abort receiving of the second signal and perform second receiving and processing on the first signal.

Optionally, in a case that a modulation scheme is complementary code keying, the abortion threshold is a second threshold; and in a case that the modulation scheme is orthogonal frequency division multiplexing, the abortion threshold is a third threshold.

Optionally, the receiving and processing module is further configured to:

based on the signal strength of the first signal, update an automatic gain control AGC value; and based on the updated AGC, perform third receiving and processing on the first signal.

Optionally, the receiving and processing module is further configured to:

in a case that a modulation scheme is orthogonal frequency division multiplexing, obtain a destination address of the first signal;

in a case that the destination address of the first signal is determined to be unmatched, determine that the first signal is the interference signal; and in a case that the destination address of the first signal is determined to be matched, receive the first signal.

In the embodiments of this application, whether a currently received target signal of the electronic device is an interference signal is dynamically determined based on a difference between signal strength of the target signal and signal strength of a currently connected access point, dynamically blocking relatively weak signals, especially signals of hidden terminals. This can prevent keeping clear channel assessment always in busy state, so as to provide a more stable data uploading environment for the electronic device, ensuring that signals can be normally and stably transmitted.

The signal receiving apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a server, a network attached storage (NAS), a personal computer (PC), a television (TV), a teller machine, a self-service machine, or the like. This is not specifically limited in the embodiments of this application.

The signal receiving apparatus in this embodiment of this application may be an apparatus with an operating system. The operating system may be an Android operating system, iOS operating system, or another possible operating system. This is not specifically limited in the embodiments of this application.

The signal receiving apparatus provided in this embodiment of this application can implement the processes implemented in the method embodiment in FIG. 1 or 5. To avoid repetition, details are not described herein again.

Figure 7:
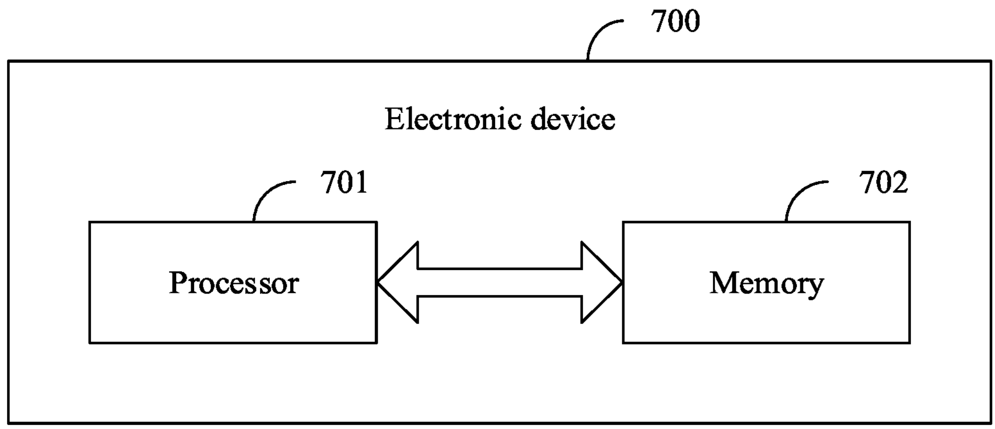
FIG. 7 is a schematic structural diagram of an electronic device according to an embodiment of this application.

Optionally, FIG. 7 is a schematic structural diagram of an electronic device according to an embodiment of this application; as shown in FIG. 7, an embodiment of this application further provides an electronic device 700, including a processor 701, a memory 702, and a program or instruction stored in the memory 702 and capable of running on the processor 701, where when the program or instruction is executed by the processor 701, the processes of the foregoing signal receiving method embodiment are implemented, with the same technical effects achieved. To avoid repetition, details are not described herein again.

It should be noted that the electronic device in this embodiment of this application includes the foregoing mobile electronic device and non-mobile electronic device.

Figure 8:
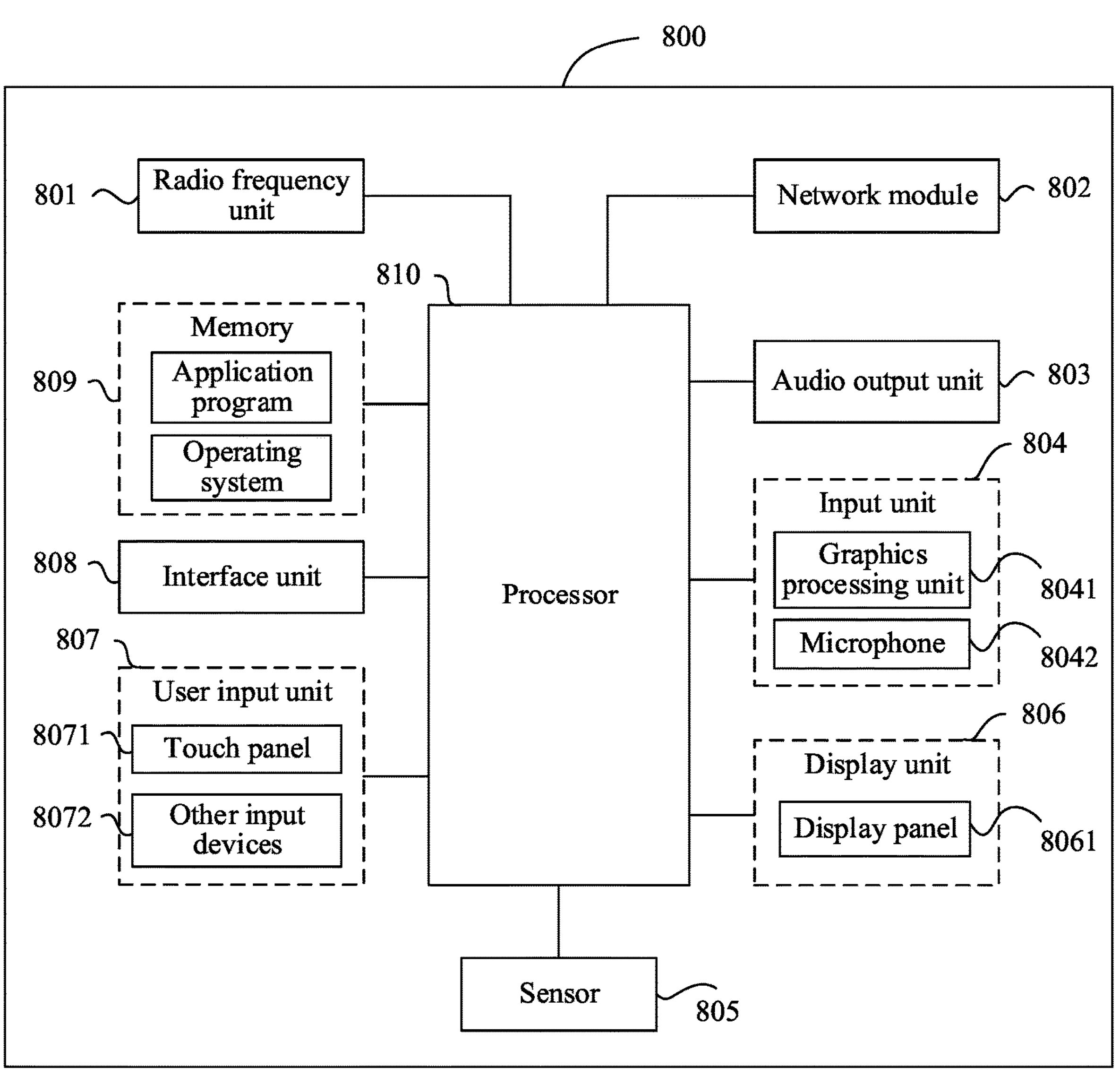
FIG. 8 is a schematic diagram of a hardware structure that implements the electronic device according to an embodiment of this application.

FIG. 8 is a schematic diagram of a hardware structure that implements the electronic device according to an embodiment of this application.

The electronic device 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

It can be understood by those skilled in the art that the electronic device 800 may further include a power supply (for example, a battery) supplying power to the components. The power supply may be logically connected to the processor 810 via a power management system, so that functions such as charge management, discharge management, and power consumption management are implemented by using the power management system. The structure of the electronic device shown in FIG. 8 does not constitute a limitation on the electronic device. The electronic device may include more or fewer components than shown in the drawing, or combine some of the components, or arrange the components differently. Details are not described herein.

The processor 810 is configured to:

obtain a first signal strength and a second signal strength before a first signal is received;

in a case that the second signal strength is greater than the first signal strength and that a difference between the second signal strength and the first signal strength is greater than or equal to a first threshold, determine that the first signal is an interference signal and determine not to receive the interference signal; and in a case that the second signal strength is less than or equal to the first signal strength, perform first receiving and processing on the first signal; where the second signal strength is signal strength from a corresponding access point, and the first signal strength is signal strength of the first signal.

In the embodiments of this application, whether a currently received target signal of the electronic device is an interference signal is dynamically determined based on a difference between signal strength of the target signal and signal strength of a currently connected access point, dynamically blocking relatively weak signals, especially signals of hidden terminals. This can prevent keeping clear channel assessment always in busy state, so as to provide a more stable data uploading environment for the electronic device, ensuring that signals can be normally and stably transmitted.

Optionally, the processor 810 is further configured to:

when a second signal is being received, in a case that the first signal strength is greater than a third signal strength of the second signal and that a difference between the first signal strength and the third signal strength is greater than or equal to an abortion threshold, abort receiving of the second signal and perform second receiving and processing on the first signal.

Optionally, in a case that a modulation scheme is complementary code keying, the abortion threshold is a second threshold; and in a case that the modulation scheme is orthogonal frequency division multiplexing, the abortion threshold is a third threshold.

Optionally, the processor 810 is further configured to:

based on the signal strength of the first signal, update an automatic gain control AGC value; and based on the updated AGC, perform third receiving and processing on the first signal.

Optionally, the processor 810 is further configured to:

in a case that a modulation scheme is orthogonal frequency division multiplexing, obtain a destination address of the first signal;

in a case that the destination address of the first signal is determined to be unmatched, determine that the first signal is the interference signal; and in a case that the destination address of the first signal is determined to be matched, receive the first signal.

In the embodiments of this application, whether a currently received target signal of the electronic device is an interference signal is dynamically determined based on a difference between signal strength of the target signal and signal strength of a currently connected access point, dynamically blocking relatively weak signals, especially signals of hidden terminals. This can prevent keeping clear channel assessment always in busy state, so as to provide a more stable data uploading environment for the electronic device, ensuring that signals can be normally and stably transmitted.

It should be understood that in this embodiment of this application, the input unit 804 may include a graphics processing unit (GPU) 8041 and a microphone 8042. The graphics processing unit 8041 processes image data of a static picture or a video that is obtained by an image capture apparatus (for example, a camera) in a video capture mode or an image capture mode. The display unit 806 may include a display panel 8061. The display panel 8061 may be configured in a form of a liquid crystal display, an organic light-emitting diode display, or the like. The user input unit 807 includes a touch panel 8071 and other input devices 8072. The touch panel 8071 is also referred to as a touch-screen. The touch panel 8071 may include two parts: a touch detection apparatus and a touch controller. The other input devices 8072 may include but are not limited to a physical keyboard, a functional button (such as a volume control button or a power on/off button), a trackball, a mouse, and a joystick. Details are not described herein. The memory 809 may be configured to store a software program and various data, including but not limited to an application program and an operating system. The processor 810 may integrate an application processor and a modem processor. The application processor mainly processes an operating system, a user interface, an application program, and the like. The modem processor mainly processes wireless communication. It can be understood that the modem processor may alternatively be not integrated in the processor 810.

An embodiment of this application further provides a non-transitory readable storage medium, where the non-transitory readable storage medium stores a program or instruction, and when the program or instruction is executed by a processor, the processes of the embodiments of the foregoing signal receiving method are implemented, with the same technical effect achieved. To avoid repetition, details are not described herein again.

The processor is the processor in the electronic device in the foregoing embodiments. The non-transitory readable storage medium includes a non-transitory computer-readable storage medium, such as a computer read-only memory (ROM), a random access memory (RAM), a magnetic disk, or an optical disc.

Another embodiment of this application provides a chip, where the chip includes a processor and a communications interface, the communications interface is coupled to the processor, and the processor is configured to run a program or instruction to implement the processes of the foregoing embodiment of the signal receiving method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that the terms “include”, “comprise”, or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by “includes a . . . ” does not preclude the presence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A signal receiving method, wherein the method comprises:

obtaining a first signal strength and a second signal strength before a first signal is received;

in response to the second signal strength being greater than the first signal strength, and a difference between the second signal strength and the first signal strength being greater than or equal to a first threshold, determining that the first signal is an interference signal and determining not to receive the interference signal; and in response to the second signal strength being less than or equal to the first signal strength, performing first receiving and processing on the first signal; wherein the second signal strength is signal strength from a corresponding access point, and the first signal strength is signal strength of the first signal;

wherein the performing first receiving and processing on the first signal comprises:

in response to a second signal being received, and the first signal strength being greater than a third signal strength of the second signal, and a difference between the first signal strength and the third signal strength being greater than or equal to an abortion threshold, aborting receiving of the second signal and performing second receiving and processing on the first signal.

2. The signal receiving method according to claim 1, wherein in response to a modulation scheme being complementary code keying, the abortion threshold is a second threshold; and in response to the modulation scheme being orthogonal frequency division multiplexing, the abortion threshold is a third threshold.

3. The signal receiving method according to claim 1, wherein the aborting receiving of the second signal and performing second receiving and processing on the first signal comprises:

based on the signal strength of the first signal, updating an automatic gain control (AGC) value; and based on the updated AGC, performing third receiving and processing on the first signal.

4. The signal receiving method according to claim 3, wherein the performing third receiving and processing on the first signal comprises:

in response to a modulation scheme being orthogonal frequency division multiplexing, obtaining a destination address of the first signal;

in response to the destination address of the first signal being determined to be unmatched, determining that the first signal is the interference signal; and in response to the destination address of the first signal being determined to be matched, receiving the first signal.

5. A chip, wherein the chip comprises a processor and a communications interface, the communications interface is coupled to the processor, and the processor is configured to run a program or instruction to implement the steps of the signal receiving method according to claim 1.

6. A computer program product, wherein the computer program product is stored in a non-volatile storage medium, and the computer program product is executed by at least one processor so as to implement the steps of the signal receiving method according to claim 1.

7. An electronic device comprising a processor, a memory, and a program or instruction stored in the memory and capable of running on the processor, wherein the program or the instruction, when executed by the processor, causes the electronic device to perform:

obtaining a first signal strength and a second signal strength before a first signal is received;

in response to the second signal strength being greater than the first signal strength, and a difference between the second signal strength and the first signal strength being greater than or equal to a first threshold, determining that the first signal is an interference signal and determining not to receive the interference signal; and in response to the second signal strength being less than or equal to the first signal strength, performing first receiving and processing on the first signal; wherein the second signal strength is signal strength from a corresponding access point, and the first signal strength is signal strength of the first signal-;

wherein the performing first receiving and processing on the first signal comprises:

in response to a second signal being received, and the first signal strength being greater than a third signal strength of the second signal, and a difference between the first signal strength and the third signal strength being greater than or equal to an abortion threshold, aborting receiving of the second signal and performing second receiving and processing on the first signal.

8. The electronic device according to claim 7, wherein in response to a modulation scheme being complementary code keying, the abortion threshold is a second threshold; and in response to the modulation scheme being orthogonal frequency division multiplexing, the abortion threshold is a third threshold.

9. The electronic device according to claim 7, wherein the aborting receiving of the second signal and performing second receiving and processing on the first signal comprises:

based on the signal strength of the first signal, updating an automatic gain control (AGC) value; and based on the updated AGC, performing third receiving and processing on the first signal.

10. The electronic device according to claim 9, wherein performing third receiving and processing on the first signal comprises:

in response to a modulation scheme being orthogonal frequency division multiplexing, obtaining a destination address of the first signal;

in response to the destination address of the first signal being determined to be unmatched, determining that the first signal is the interference signal; and in response to the destination address of the first signal is-signal being determined to be matched, receiving the first signal.

11. A non-transitory readable storage medium, wherein the non-transitory readable storage medium stores a program or instruction, the program or the instruction, when executed by a processor, causes the processor to perform:

obtaining a first signal strength and a second signal strength before a first signal is received;

in response to the second signal strength being greater than the first signal strength, and that-a difference between the second signal strength and the first signal strength being greater than or equal to a first threshold, determining that the first signal is an interference signal and determining not to receive the interference signal; and in response to the second signal strength being less than or equal to the first signal strength, performing first receiving and processing on the first signal; wherein the second signal strength is signal strength from a corresponding access point, and the first signal strength is signal strength of the first signal;

wherein performing first receiving and processing on the first signal comprises:

in response to a second signal being received, and the first signal strength being greater than a third signal strength of the second signal, and a difference between the first signal strength and the third signal strength being greater than or equal to an abortion threshold, aborting receiving of the second signal and performing second receiving and processing on the first signal.

12. The non-transitory readable storage medium according to claim 11, wherein in response to a modulation scheme being complementary code keying, the abortion threshold is a second threshold; and in response to the modulation scheme being orthogonal frequency division multiplexing, the abortion threshold is a third threshold.

13. The non-transitory readable storage medium according to claim 11, wherein the aborting receiving of the second signal and performing second receiving and processing on the first signal comprises:

based on the signal strength of the first signal, updating an automatic gain control (AGC) value; and based on the updated AGC, performing third receiving and processing on the first signal.

14. The non-transitory readable storage medium according to claim 13, wherein the performing third receiving and processing on the first signal comprises:

in response to a modulation scheme being orthogonal frequency division multiplexing, obtaining a destination address of the first signal;

in response to the destination address of the first signal being determined to be unmatched, determining that the first signal is the interference signal; and in response to the destination address of the first signal being determined to be matched, receiving the first signal.

* * * * *